ARRANGEMENT FOR THE SYNCHRONIZATION OF A PROJECTOR WITH A TAPE RECORDER

Filed June 12, 1962

Inventors:
Karl Cech
Friedrich Förch
By Ernest G. Montague
attorney

United States Patent Office 3,223,469

Patented Dec. 14, 1965

3,223,469

ARRANGEMENT FOR THE SYNCHRONIZATION OF A PROJECTOR WITH A TAPE RECORDER

Karl Cech, Modling, near Vienna, and Friedrich Förch, Vienna, Austria, assignors to Karl Vockenhuber and Christl Hauser, both of Vienna, Austria Filed June 12, 1962, Ser. No. 202,016
Claims priority, application Austria, July 7, 1961, A 5,239/61
5 Claims. (Cl. 352—14)

The present invention relates to an arrangement for the synchronization of a film projector with a separate tape recorder by controlling the projector motor according to the difference between image- and sound carrier, whereby the synchronous regulating device is operated in a purely mechanical way by the tape.

The sound recordings in these devices are usually thus effected, that during the projection of the film a synchronously running tape is suitably provided with comments or with a musical background. It is, however, often desired to rerecord on the tape original sound recording, taken simultaneously with the filming. For this reason, the first tape recorder, which is connected to the projector by the synchronous device, is turned on to recording and eventually electrically connected by interposition of a mixing desk with a second tape recorder, through which device the original sound recording is played back. If the length of the scenes thus post-synchronized with the original sounds is relatively short, special synchronous regulating devices between the two tape recorders, respectively, between the film projector and the second tape recorder can be dispensed with, without the occurrence of a noticeably synchronous disalignment between image and sound. An essential condition for this, however is, that the film projector and the synchronous connected tape recorder on the one hand, and the second tape recorder on the other hand, are set exactly to start of the scene before starting and that both tape recorders are started simultaneously. Whereas the setting of the devices to start of the scene presents no difficulties, it was so far not possible to start the two tape recorders simultaneously in a simple manner and with the essential accuracy.

It is, therefore, one object of the present invention to create an arrangement for the synchronization of a projector with a tape recorder, which enables in a simple manner the simultaneous start of the two tape recorders.

It is a further object of the present invention to provide an arrangement for the synchronization of a projector with a tape recorder, such that it may be used on the synchronous regulating device without altering its construction, in order that the subsequent equipment with the start-switching device of already existing devices is possible.

Figure 1:
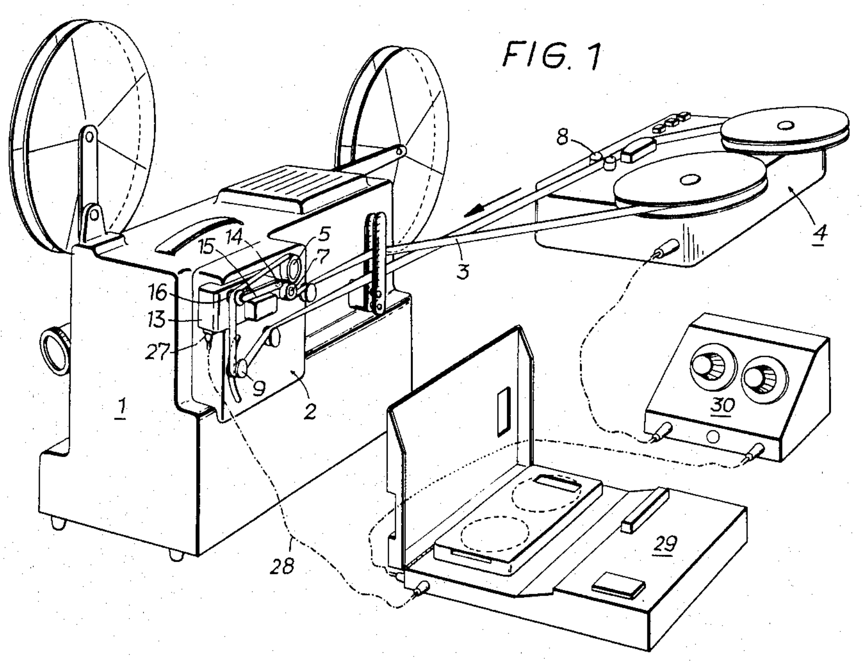
Figure 2:
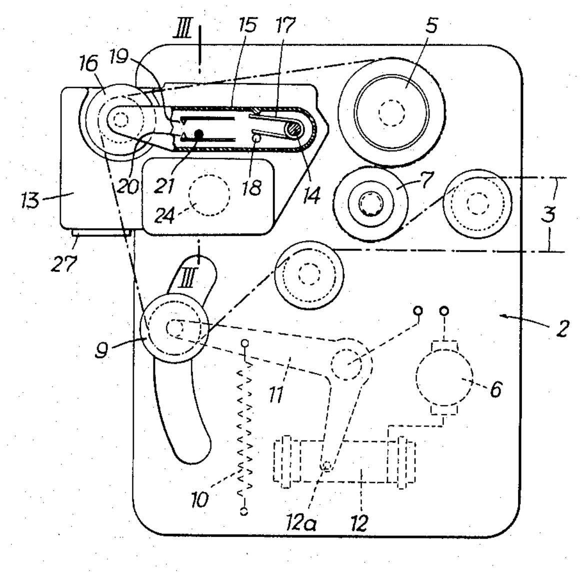
Figure 3:
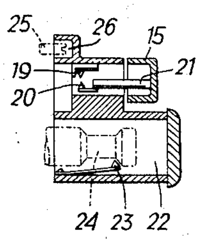

With these and other objects in view, which will become apparent in the following detailed description, the present invention will be clearly understood in connection with the accompanying drawing, in which:

FIG. 1 is an arrangement for the rerecording of a sound recording on a tape recorder, operating synchronously with a film projector; FIG. 2 is a view of the switching arrangement; and FIG. 3 is a section along the lines 3—3 of FIG. 2.

Referring now to the drawing, and in particular to FIG. 1, a substandard film projector 1 is disclosed, on the backwall of which a synchronous regulating device 2 is provided, which regulates the image frequency of the projector responsive to the running speed of a tape 3 of a tape recorder 4. Synchronous regulating devices of the described type are known and comprise a driving roller 5, which is driven by a projector motor 6. The roller 5 is surrounded by the tape 3, which is pressed by the pressure roller 7 against the roller 5. The tape 3 is driven with constant speed by a capstan 8 in the tape recorder 4 and forms a loop in the part of the tape 3 located between the capstan 8 and the driving roller 5, the size of the loop being controlled by a roller 9. The roller 9 is arranged on a lever 11 which is biased by a spring 10, which lever 11 adjusts a variable resistor 12 in the circuit of the projector motor 6 and thus determines the number of revolutions of the same. If the tape recorder 4 is at rest, the tape loop is reduced. A slider **12*a*, which is connected with the lever 11, glides from the wire covered part of the variable resistor 12 and arrives at an insulating point of the body of the resistor 12**.

On this actually known synchronous regulating device a plate 13 is mounted, on which a lever 15 is pivotally mounted by means of a pivot 14. The lever 15 carries on its free end a roller 16, and the tape 3 runs over the roller 16. Under the action of a spring 17, which is propped up on a stationary bolt 18, the lever 15 endeavors to turn clockwise, contrary to the tension of the tape 3. A pin 21, arranged on the lever 15, controls a contact 20. When the tape 3 is heavily stretched, the contact 20 is moved away from an engaging contact 19. When loosening of the tension of the tape 3 occurs, the spring 17 deviates the lever 15, whereby the contacts 19 and 20 of the switch are closed.

The plate 13 has an opening 22, which, when mounted on the synchronous regulating device, encloses a shouldered post 24 (shown by a broken line) of the same device. Through a locking spring 23 the switching arrangement is fixed on the roller 24.

A screw 25 is provided for the alignment of the switching arrangement on the synchronous device, which screw 25 engages in a relevant opening 26 of the plate 13. The contacts 19 and 20 are conductively connected with a connector socket 27. In the shown arrangement this connector socket 27 is connected by a cable 28 to the start sockets of a portable sub-miniature tape reproducer. The output of this device is connected with the input circuit of the tape recorder 4 over a mixing desk 30.

The spring 17 is dimensioned such, that the tension exerted on the tape 3 by the lever 15 is greater than the tensional force transferred to the tape 3 by the roller 9, but smaller than the maximum tension caused by the capstan 8 on the tape 3. Tests have proved, that good results may be achieved with an arrangement, where the tension necessary for the operation of the starting switch amounts to approximately 1.5 times of the tension exerted by the roller 9.

The switching arrangement is fixed on a shouldered post 24 of the synchronous regulating device by simple slipping-on and can be mounted also on already existing devices.

The mode of operation of the new arrangement is as follows: At a standstill of the tape recorder 4 the tape loop has its minimum length on the synchronous regulating device, the roller 9 is thus in its highest position, and the slider **12*a* on an insulating point of the resistor 12. The tape 3 is tightened and presses the lever 15 down, whereby the contacts 19 and 20 are separated from each other. At the standstill the tension of the tape 3 is determined by the friction connection of the tape 3 on the capstan 8 of the tape recorder 4** and is considerably higher than the tension occurring during the operation of the device.

When switching on the tape recorder 4, the tape tension is reduced to a value, which is determined by the spring 10, which bears upon the roller 9. Due to the decrease of the tape tension the spring 17 can turn the lever 15 clockwise. The pin 21 thus releases the contact 20, which elastically joins the opposite contact 19. Thus the starting current circuit for the tape reproducer 29 is closed. Due to the very short length of travel of the lever 15, the tape reproducer 29 is being started with a neglectably short delay compared with the tape recorder 4. As for the time being the film projector is still at rest, the regulating loop of the tape enlarges, until the slider 12*a* reaches the wire covered part of the resistor 12. The projector motor 6 is thus switched on. The regulating device reaches its stationary adjustment after a short transient.

For the post-synchronization of a scene, the start of the scene on the film is first set to a corresponding synchronization mark on the projector. Then the start of the original sound recording of the scene is searched for on the tape reproducer 29 and the tape set to a synchronization mark. The searching for the start of the scene may be facilitated by optical or acoustical marks on the tape. On the mixing desk 30, the degree of modulation factor can be set, with which the original sound recording is recorded on the tape recorder 4. The tape reproducer 29 is set to playback, whereas the tape recorder 4 is in the position "recording." By pressing the starting switch of the tape recorder 4, the whole arrangement may be put into operation in the manner described above, whereby the original sound recording is rerecorded on the tape 3 and the tape is moved from a first reel through an acoustic head and a capstan 8 to form a loop and to return to a second reel. At the same time with the rerecording, the recording may be provided over the mixing desk with a background music or with a commentary. After the end of the scene, the tape recorder 4 and thus automatically also the projector are put at rest and the tape reproducer 29 switched off by hand. After aligning the devices to the start of the scene, the next scene may be rerecorded.

Advantageously, the starting mechanism for the tape reproducer is designed such, that the start is brought about by a relatively short starting impulse, and the operation of the tape reproducer continues after exhaust of the starting impulse. The operation of the recorder is stopped either manually or by a particular circuit opening relay. The arrangement can be made according to the solution mentioned in the Patent No. 3,125,645.

It is decisive for an irreproachable function of the arrangement, that the lever 15 has as short a length of travel as possible. When the length of travel is long and thus the resulting moving period is long, parts without recording occur between the single sound scenes due to the retarded starting of the tape reproducer. A compensation by a corresponding disalignment of the tape 3 in the tape recorder 4 is not possible, as the end of the preceding scene would be erased.

While we have disclosed one embodiment of the present invention, it is to be understood that this embodiment is given by example only and not in a limiting sense, the scope of the present invention being determined by the objects and the claims.

We claim:

1. In an arrangement for the synchronization of a film projector with a separate sound tape recorder, a film projector, including a driving roller, a driving motor for said film projector feeding film through the latter, a sound tape recorder including a capstan pulling a tape from said projector, said driving roller drawing said tape from said recorder, a synchronous control means controlling the running speed of said driving motor, said synchronous control means being mechanically operated by said film projector and by the sound tape of said recorder, and including a pivoted, spring-biased lever including a spring tending to tension said sound tape, a tape reproducer including a remote starting device for the latter, an electric circuit including said remote starting device and a switch, said switch being operated by said pivoted, spring-biased lever in response to the tension of said sound tape said spring of said spring-biased lever being dimensioned such that the tension of said sound tape required for operation of said switch is greater than the tension of said sound tape required for the operation of said synchronous control means.

2. The arrangement, as set forth in claim 1, wherein said synchronous control means comprises a synchronous regulating device including said driving roller driving said sound tape at a speed corresponding with the speed of said film, said sound tape defining a loop between said driving roller and said capstan, said pivoted, spring-biased lever resting against said tape loop under the action of said spring, a variable resistor in series with said driving motor and controlled by said levers, and said synchronous regulating device including a second pivoted spring-biased lever having a second spring and resting against said sound tape by the action of said second spring.

3. The arrangement, as set forth in claim 2, wherein said second spring is dimensioned such, that the tension of said sound tape required for operation of said switch in said remote starting device amounts to about 150% of the tension of said sound tape required for the operation of said synchronous regulating device.

4. The arrangement, as set forth in claim 1, which includes a base plate detachably secured to said film projector, and said pivoted lever, said starting switch and said spring are secured to said base plate.

5. The arrangement, as set forth in claim 1, which includes a base plate detachably secured to said film projector and having an opening, a shouldered post provided on said film projector and received in said opening, a locking device provided on said base plate and engaging said shouldered post and detachably fastening said base plate to said film projector, and said pivoted lever, said starting switch and said spring being secured to said base plate.

References Cited by the Examiner

UNITED STATES PATENTS

| | | | |
|---|---|---|---|
| 3,025,751 | 3/1962 | Braun | 352—14 |

FOREIGN PATENTS

| | | |
|---|---|---|
| 214,942 | 9/1957 | Australia. |
| 1,221,807 | 1/1960 | France. |
| 731,232 | 6/1955 | Great Britain. |

NORTON ANSHER, *Primary Examiner.*

WILLIAM MISIEK, *Examiner.*